UNITED STATES PATENT OFFICE.

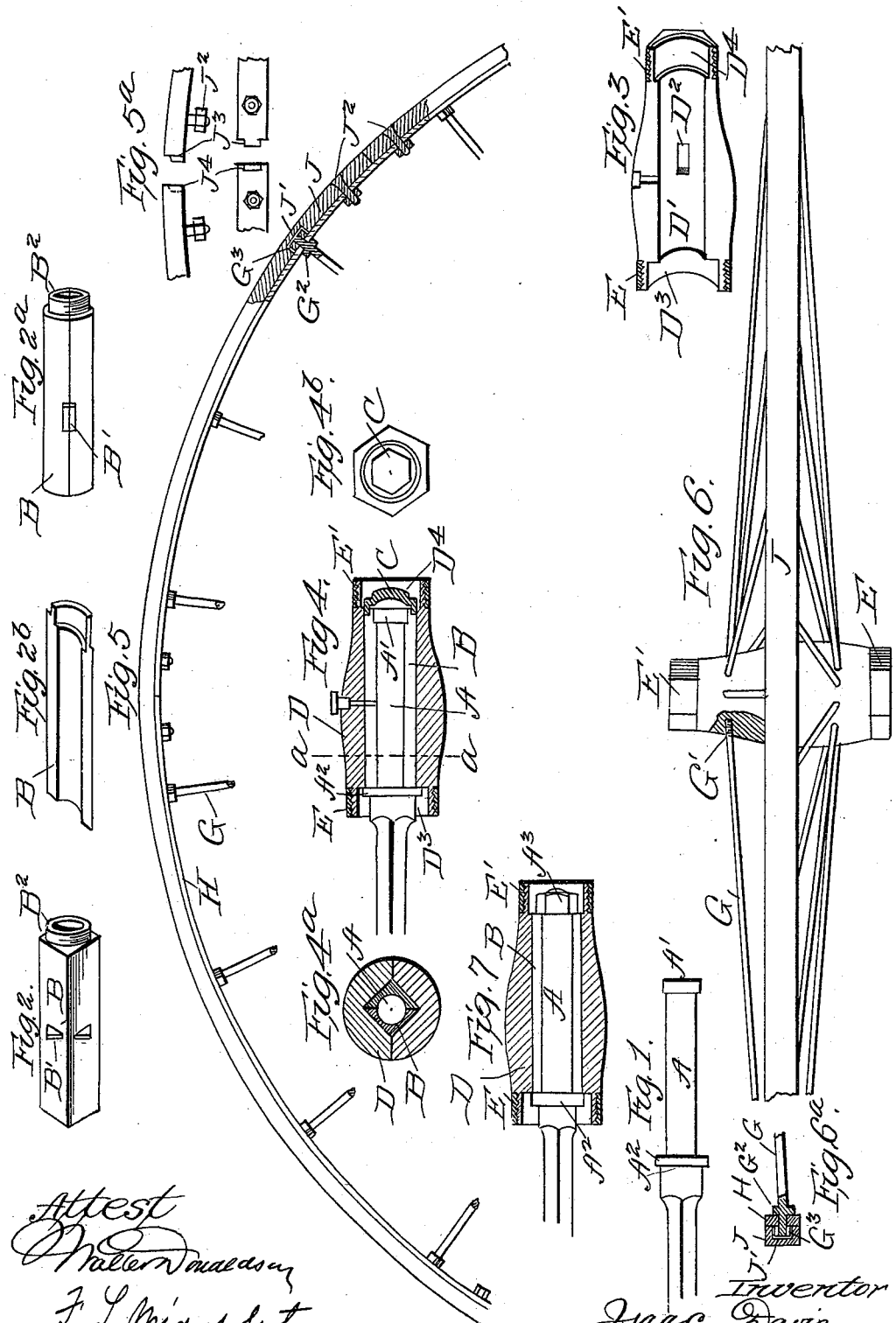

ISAAC DAVIS, OF ARMADALE, VICTORIA.

WHEEL AND AXLE FOR CARRIAGES.

SPECIFICATION forming part of Letters Patent No. 544,664, dated August 20, 1895.

Application filed September 20, 1894. Serial No. 523,627. (No model.)

*To all whom it may concern:*

Be it known that I, ISAAC DAVIS, gentleman, a subject of Her Majesty the Queen of Great Britain and Ireland, and a resident of High Street, Armadale, in the British colony of Victoria, have invented a certain new and useful Improved Wheel and Axle for Carriages and other Road Vehicles, of which the following is a specification.

The invention comprises a sectional hub, a sectional axle-box, with means for holding them together, and a sectional rim and features of construction hereinafter pointed out.

The annexed drawings illustrate the several parts of my invention, and throughout it similar letters will be used to facilitate reference to corresponding parts.

Figure 1 shows the axle with an outer solid collar; Fig. 2, the axle-box when its outer surface is of a rectangular section, and Fig $2^a$ when it is of a circular section, while Fig $2^b$ shows a half part of the axle-box. Fig. 5 shows one-half of the hub; and Fig. 4 the axle, axle-box, and hub as fitted together, Fig $4^a$ being a section on line $a$ $a$, Fig. 4, and Fig. $4^b$ a view of the outer end of the hub with the movable cap in position. Fig. 5 is an enlarged view, partly in section, of the rim, tire, and outer ends of wheel-spokes; and Fig. $5^a$, details of the tire-joints. Fig. 6 is a broken edge view of a complete wheel, and Fig. $6^a$ a section through the rim and tire and also showing the method of securing the spokes.

In Figs. 1 to $6^a$ the preferred arrangement of my invention is shown, A being the axle furnished with an outer solid collar A′ and the ordinary inner collar $A^2$. B is the two-part axle-box, having its outer surface either rectangular, polygonal, or circular in section and provided with lugs or projections, such as B′. $B^2$ is the screwed or threaded outer end part of axle-box, which receives the movable screw cap or cover C. D is the two-part hub, the core or central hole D′ of which is made to accurately fit over the outer surface of axle-box B, while recesses, such as $D^2$, are formed to receive the lugs or projections B′ of the axle-box. The inner end $D^3$ of the core or hole of the hub is made large enough to pass over the inner collar $A^2$ of axle and the outer hole $D^4$ large enough to clear the cap or cover C. Both end parts of the hub are screwed or threaded to receive the annular screw-nuts E and E′, respectively, and which nuts serve to secure or couple the two halves of the hub D together. F is the cup-lubricator, fitted at the position shown in Fig. 4. G are the spokes, the inner end of each being screwed into the hub, as shown at G′ in Fig. 6, while the outer end part of each is screwed and furnished with a collar $G^2$. The screwed end part of the spokes passes through holes formed in the several sections of rim H, and is secured in position thereon by screw-nuts $G^3$. J is the tire having recesses J′ formed at the requisite positions in its inner surface to pass or fit over the said nuts $G^3$. Both the rim H and tire J are made in sections of two or more parts, the joints of each being crossed, as shown in Fig. 5. Then on each side of the joint and at other necessary positions they are bolted together by tapered or countersunk bolts, such as $J^2$, Fig. 5. The end joint of the several sections of the tire is formed as shown in Fig. $5^a$—that is, with a tenon $J^3$ and mortise or recess $J^4$, which fit neatly into one another to prevent the joints moving or springing sidewise.

Having fully described my invention, what I claim, and desire to secure by Letters Patent, is—

1. In combination, the axle box formed of sections with projections on their outer sides, and the hub formed of sections with recesses in the interior thereof, to receive the projections, the said sections of the hub and box being arranged to break joints, and means for holding the sections of the box and hub together with their projections and recesses in engagement, substantially as described.

2. In combination, the wheel having a sectional hub with recesses in said sections, the axle, the divided axle box and the cap screwed onto the end of the axle box serving to hold the sections thereof together and forming an inclosed grease receptacle at the end of the axle, said axle box sections having projections to fit the recesses in the hub sections whereby the box with the cap will move with the hub substantially as described.

3. A wheel comprising a divided axle box and a divided hub with recesses and projections between the sections and means for holding the sections of the hub and box together with the projections engaging the recesses, the rim made up of sections, the tire made up of sections and bolted to the rim and the spokes connecting the divided rim with the divided hub screwed into the latter and bolted to the former, substantially as described.

In witness whereof I have hereunto set my hand in presence of two witnesses.

ISAAC DAVIS.

Witnesses:
    BEDLINGTON BODGCOMB,
    W. J. S. THOMPSON.